United States Patent [19]

Hashimoto et al.

[11] Patent Number: 4,481,231
[45] Date of Patent: Nov. 6, 1984

[54] METHOD FOR PRODUCTION OF MAGNETIC RECORDING MEDIA

[75] Inventors: Hiroshi Hashimoto; Tsutomu Okita; Noburo Hibino, all of Kanagawa, Japan

[73] Assignee: Fuji Photo Film Co., Ltd., Kanagawa, Japan

[21] Appl. No.: 559,534

[22] Filed: Dec. 8, 1983

[30] Foreign Application Priority Data

Dec. 8, 1982 [JP] Japan ................................ 57-215992

[51] Int. Cl.$^3$ ............................................. H01F 10/02
[52] U.S. Cl. ..................................... 427/44; 427/128; 427/130; 427/132
[58] Field of Search .......................... 427/44, 128–132, 427/48; 252/62.54; 428/900

[56] References Cited

U.S. PATENT DOCUMENTS 4,343,831  8/1982  Tsuji et al. ............................ 427/44

FOREIGN PATENT DOCUMENTS 031937  9/1979  Japan .

Primary Examiner—Bernard D. Pianalto
Attorney, Agent, or Firm—Sughrue, Mion, Zinn, Macpeak & Seas

[57] ABSTRACT

A method for the production of a magnetic recording medium is disclosed. The method involves coating a support base with a magnetic coating composition. The support base has a percent thermal shrinkage in the direction corresponding to the longitudinal direction of the support base of not more than 0.15%. The magnetic coating composition contains a compound having not less than two acrylate groups or methacrylate groups in the molecule and includes ferromagnetic fine powder dispersed therein. After coating the magnetic coating composition on the support base it is irradiated with an electron beam. The resulting medium has excellent electromagnetic properties, durability and improved tape skew characteristics. Further, the composition has good storage stability.

10 Claims, No Drawings

METHOD FOR PRODUCTION OF MAGNETIC RECORDING MEDIA

FIELD OF THE INVENTION

The present invention relates to a method for the production of magnetic recording media such as video tape, audio tape, computer tape and the like.

BACKGROUND OF THE INVENTION

At the present time, generally and widely used magnetic media contain thermoplastic resins such as vinyl chloride-vinyl acetate resins, vinyl chloride-vinylidene chloride resins, cellulose resins, acetal resins, urethane resins, acrylonitrile-butadiene resins and the like, alone or in combination as binder. However, the use of such binders results in inferior abrasion resistance which causes stains on the running path of the magnetic tape.

Furthermore, the methods employing thermosetting resins such as melamine resin, urea resin, etc., and the methods adding a chemically cross-linkable binding agent such as isocyanate compound, epoxy compound, etc., to the above mentioned thermoplastic resin are known. However, the use of cross-linkable binding agent has serious drawbacks such as: (1) the resin solution dispersed with magnetic substance shows poor storage stability, i.e., short pot life, which causes lack of uniformity of physical properties of magnetic coating composition and therefore homogeneity of magnetic tape, and (2) after coating and drying, heat treatment process is necessary for hardening the coating layer, which requires a long period for the production of commercial products.

For the purpose of preventing these drawbacks, methods for the production of magnetic materials employing oligomers and monomers of acrylic acid esters as binding agents and hardening them by irradiation of electron beam are disclosed in Japanese Patent Publication No. 12423/72, Japanese Patent Application (OPI) Nos. 15104/72, 77433/75, 86130/82 and 127926/82 (the term "OPI" as used herein refers to a "published unexamined Japanese patent application"), U.S. Pat. No. 3,871,908 and British Pat. Nos. 2,055,877-B and 2,084,589. However, the methods disclosed in the above preceding technique did not afford magnetic recording media with excellent electromagnetic properties and high durability.

Recently, the improvement of tape skew has been highly desired in the field of small video tape for household use. Furthermore, video tape has been used under rigorous conditions due to the multifunctionalization of video tape recorder. However, there exists no tape having improved electromagnetic properties, tape skew and durability which satisfies the above mentioned requirements.

SUMMARY OF THE INVENTION

An object of the present invention is to provide magnetic recording media with excellent electromagnetic properties.

Another object is to provide magnetic recording media having a magnetic layer with excellent durability.

Yet another object is to provide magnetic recording media with improved tape skew.

Still another object is to provide homogeneous magnetic recording media made from magnetic coating composition with good storage stability.

Yet another object is to provide magnetic recording media with excellent abrasion resistance.

Still yet another object is to provide magnetic recording media, for which heat treatment process to harden the coating layer is unnecessary.

Another object is to provide a method for the production of these magnetic recording media.

The above objects of this invention are achieved by coating the support base having a percent thermal shrinkage in the direction corresponding to the longitudinal direction of the support base of not more than 0.15% with a magnetic coating composition containing a compound having not less than two acrylate groups or methacrylate groups per molecule and ferromagnetic fine powder, and irradiating the coated support base with an electron beam. Percent thermal shrinkage means a value measured after generating thermal shrinkage at 70° C. for 48 hours under tension-free conditions.

DETAILED DESCRIPTION OF THE INVENTION

The invention involves irradiation by an electron beam after coating the support base having a percent thermal shrinkage in the direction corresponding to the longitudinal direction of the support base (e.g., tape) of not more than 0.15% with a magnetic coating composition containing a compound polymerizable by the electron beam. The synergistic effect of these treatments affords magnetic recording media with excellent electromagnetic properties, durability, skew and running property.

Preferred examples of the compounds having not less than two acrylate groups or methacrylate groups per molecule which are polymerizable by the electron beam include acrylates such as diethylene glycol diacrylate, triethylene glycol diacrylate, tetraethylene glycol diacrylate, trimethylolpropane triacrylate, pentaerythritol tetraacrylate, etc., methacrylates such as diethylene glycol dimethacrylate, triethylene glycol trimethacrylate, tetraethylene glycol dimethacrylate, trimethylolpropane trimethacrylate, pentaerythritol tetramethacrylate, etc., acrylic acid or methacrylic acid esters of other two or more functional polyols having 4 to 50 carbon atoms, and polymeric compounds having not less than two acryloyl groups or methacryloyl groups in the end of the main chain or the side chain of polymer chain.

Examples of the polymeric compounds having acryloyl groups or methacryloyl groups in the end of the main chain or the side chain of polymer chain are cited in A. Vrancken, *Fatipec Congress,* 11, 19 (1972). One example of these compounds is shown below

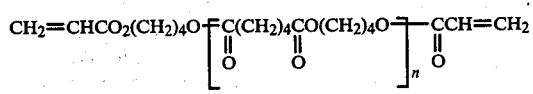

The polyester skeleton of the exemplified compound can be replaced by polyurethane skeleton, skeleton of epoxy resin, polyether skeleton, polycarbonate skeleton or a mixed skeleton of any of these. The molecular weight is favorably in the range of from 1,000 to 20,000, but is not limited.

These polymerizable compounds can be used as mixtures. Furthermore, the composition of this invention can be mixed with compound(s) havng one carbon-carbon unsaturated bond polymerizable by an electron beam in the molecule.

Preferred examples of materials which can be utilized as a support base include polyesters such as polyethylene terephthalate and polyethylene 2,6-naphthalate, cellulose resins such as cellulose acetate, cellulose triacetate, cellulose acetate butyrate and cellulose propionate, ionomers, polyimides, polyamides, polyamideimides, polyvinyl chloride, polyvinyl chloride copolymers, polysulfones, polycarbonates and the like. Of these, polyesters are particularly preferred.

When the percent thermal shrinkage exceeds 0.15%, the skew value increases with an increase in the shrinkage value and distortion of TV picture becomes serious. The picture can be seen visually almost naturally at the shrinkage value of not more than 0.15%. Therefore, the percent thermal shrinkage of not more than 0.15% can be assumed as one criterion.

The percent thermal shrinkage of not more than 0.15% can be accomplished effectively by, for example, pretreatment of the support base with heat. Continuous heat treatment can be carried out by treating the support base for 2 to 20 seconds at a temperature of 100° to 140° C. under a tension of 0 to 8 kg/100 cm·width, favorably for 3 to 10 seconds at 110° to 130° C. under 0 to 4 kg/100 cm·width.

Examples of ferromagnetic powder which can be used in the present invention include ferromagnetic iron oxide fine powder, Co-doped ferromagnetic iron oxide fine powder, ferromagnetic chromium dioxide fine powder, ferromagnetic alloy powder, barium ferrite and the like. An effective acicular ratio of ferromagnetic iron oxide or chromium dioxide is in the range of from about 2/1 to about 20/1, preferably not less than 5/1, and an effective average length ranges from about 0.2 to about 2.0 μm. Percent metallic part of ferromagnetic alloy powder is not less than 75 wt% and the metallic part of not less than 80 wt% is composed of ferromagnetic metal (namely, Fe, Co, Ni, Fe-Co, Fe-Ni, Co-Ni, Fe-Co-Ni) with long diameter of about 1.0 μm or less. The ferromagnetic powder is preferably used in an amount of 3 to 6 parts by weight per part by weight of the binder.

Examples of an organic solvent which can be used in preparation of the magnetic coating composition include ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; glycol ethers such as ether, glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, ethylene chlorohydrin, dichlorobenzene, etc., and the like.

Furthermore, additives such as lubricants, abrasives, dispersing agents, rust preventives and the like can be added to the magnetic coating composition of this invention. Particularly, examples of the lubricants include saturated and unsaturated higher fatty acids, fatty acid esters, higher fatty acid amides, higher alcohols, silicone oils, mineral oils, food oils, fluorine compounds and the like. These lubricants can be added at preparation of the coating composition. Otherwise, after drying, treating for smoothing or hardening with an electron beam, the surface of the magnetic layer can be coated or sprayed with these lubricants in bulk form or in a solution of organic solvent.

As an electron beam accelerator, a scanning method, double scanning method, curtain beam method or broad beam curtain method can be applied.

A useful electron beam has an acceleration voltage in the range of from 100 to 1,000 kv, preferably from 150 to 300 kv and applies an absorption dose in a range between 0.5 and 20 megarad, preferably between 3 and 15 megarad. Energy transmittance is not sufficient at an acceleration voltage of less than 100 kv, while the use of the voltage of above 1,000 kv is not economical because energy efficiency for polymerization decreases. The hardening reaction will not proceed sufficiently to form a magnetic layer with the desired strength if the absorption dose is less than 0.5 megarad. On the other hand, when it is above 20 megarad, energy efficiency decreases and heat is generated by the irradiation so that the support base (particularly a plastic support base) may be deformed.

The thickness of magnetic layer produced according to the process of the present invention is generally from 1 to 50 μm and preferably from 2 to 10 μm.

The present invention will now be explained in more detail by examples and comparative examples below. "Part(s)" means "part(s) by weight" in the following examples and comparative examples. The scope of the invention is not limited to these examples.

EXAMPLE 1

|  | parts |
|---|---|
| γ-Fe$_2$O$_3$ | 400 |
| Acrylated compound of ester type polyurethane resin (number average molecular weight: about 20,000) | 80 |
| Trimethylolpropane triacrylate | 20 |
| Lecithin | 4 |
| Stearic acid | 4 |
| Butyl stearate | 4 |
| Methyl ethyl ketone | 1,000 |

A 15 μm thick polyethylene terephthalate support base treated with heat at 110° C. for 4 seconds under rolling tension of 0.2 kg/mm$^2$ was coated with a magnetic coating composition which was obtained by kneading the above components for 50 hours by means of a ball mill to form a magnetic layer having a dry thickness of 5 μm, using a doctor blade. After orienting the magnetic substances by means of a cobalt magnet, the solvent was evaporated by drying (100° C., 1 minute). Then, smoothing treatment (roll temperature 60° C., pressure 100 kg/cm$^2$) was carried out by means of a five-step calender consisting of groups of cotton roll and specular roll.

Next, the resulting material was irradiated by an electron beam at an acceleration voltage of 200 kv and a beam current of 10 mA until the absorption dose reached to 10 Mrad. This sample was called Sample No. 1.

EXAMPLE 2

Sample No. 2 was obtained by the same procedure as in Example 1, except that the heat treatment was changed to 120° C. for 2 seconds.

COMPARATIVE EXAMPLE 1

Sample No. 3 was obtained by the same procedure as in Example 1, except that the heat treatment of the support base was not carried out.

COMPARATIVE EXAMPLE 2

Sample No. 4 was obtained by the same procedure as in Example 1, except that the binder having the composition given below was used, and the electron beam irradiation was not carried out.

| | parts |
|---|---|
| Vinyl chloride-vinyl acetate-vinyl alcohol copolymer (copolymerization ratio = 89/3/8) | 90 |
| Urethane resin | 10 |

COMPARATIVE EXAMPLE 3

Sample No. 5 was obtained by the same procedure as in Comparative Example 1, except that the binder was changed as follows.

| | parts |
|---|---|
| Vinyl chloride-vinyl acetate-maleic acid copolymer (copolymerization ratio = 78/12/10) | 90 |
| Urethane resin | 10 |

COMPARATIVE EXAMPLE 4

Sample No. 6 was obtained by the same procedure as in Example 2, except that the binder having the composition given below was used, and the electron beam irradiation was not carried out.

| | parts |
|---|---|
| Vinyl chloride-vinyl acetate-maleic acid copolymer (copolymerization ratio = 78/12/10) | 90 |
| Urethane resin | 10 |

COMPARATIVE EXAMPLE 5

Sample No. 7 was obtained by the same procedure as in Comparative Example 1, except that the binder having the composition given below was used, and the electron beam irradiation was not carried out.

| | parts |
|---|---|
| Vinyl chloride-vinyl acetate-vinyl alcohol copolymer (copolymerization ratio = 89/3/8) | 90 |
| Urethane resin | 10 |

After the running repeated 100 times by means of video tape recorder, dynamic friction coefficient, still durable time, squareness ratio (residual magnetic flux density/maximum magnetic flux density), skew and percent thermal shrinkage of the support base of samples obtained in Examples 1-2 and Comparative Examples 1-5 were measured. The results are shown in Table 1.

TABLE 1

| Sample No. | Squareness Ratio | Skew[1] (μsec) | Percent Thermal Shrinkage of Support[2] | Dynamic Friction Coefficient after Repeated Running[3] | Still Durability[4] |
|---|---|---|---|---|---|
| 1 | 0.83 | 16 | 0.15 | 0.21 | Not less than 60 min |
| 2 | 0.83 | 12 | 0.10 | 0.21 | Not less than 60 min |
| 3 (comparison) | 0.83 | 22 | 0.20 | 0.21 | Not less than 60 min |
| 4 (comparison) | 0.75 | 16 | 0.15 | Stopped by adhesion | 3 min |
| 5 (comparison) | 0.75 | 16 | 0.15 | 0.56 | 15 min |
| 6 (comparison) | 0.76 | 12 | 0.10 | 0.50 | 12 min |
| 7 (comparison) | 0.73 | 22 | 0.20 | 0.68 | 4 min |

Note
[1] Skew was measured at 40° C. under an atmosphere of 80% RH after 300 runs, using a VTR of NV-3300 made by Matsushita Electric Industrial Co., Ltd.
[2] Percent thermal shrinkage was measured by generating thermal shrinkage at 70° C. for 48 hours under tension-free conditions.
[3] Dynamic friction coefficient ($\mu$) was defined by the following equation and running tension was evaluated by this value, wherein $T_1$ means tape tension at the feed side of the rotating cylinder and $T_2$ means tape tension at the take-up side. A VHS video tape recorder (NV 8200 type, made by Matsushita Electric Industrial Co. Ltd.) was used. $T_2/T_1 = \exp(\mu\pi)$ (measured at 40° C. under 65% RH) The values shown in Table 1 are those taken after running the tapes repeatedly 100 times.
[4] Still durability means the period until the still mode picture reproduced loses its clearness. The video signal was recorded on video tape (each sample), using a VHS video tape recorder (NV 8200 type, made by Matsushita Electric Industrial Co., Ltd.) (5° C., 80% RH).

From these results, it is clearly seen that percent thermal shrinkage should be not more than 0.15% in order to maintain the skew at not more than 17 μsec, at which range a normal picture can be seen. Furthermore, the electromagnetic properties such as the squareness ratio, durability and running properties are improved by coating the support base with a magnetic coating composition containing a compound having not less than two acrylate groups or methacrylate groups per molecule and ferromagnetic fine powder, and irradiating the resulting material with electron beams.

While the invention has been described in detail and with reference to specific embodiments thereof, it will be apparent to one skilled in the art that various changes and modifications can be made therein without departing from the spirit and scope thereof.

What is claimed is:

1. A method for producing a magnetic recording medium, comprising the steps of:
   coating a support base with a magnetic coating composition, wherein the support base has a percent thermal shrinkage in the direction corresponding to the longitudinal direction of the support base of not more than 0.15% and further wherein the magnetic coating composition contains a compound having not less than two acrylate groups or methacrylate groups per molecule, and a ferromagnetic fine powder dispersed therein; and
   irradiating the coated support base with an electron beam.

2. A method as claimed in claim 1, wherein the magnetic coating composition includes a compound selected from the group consisting of diethylene glycol diacrylate, triethylene glycol diacrylate, tetraethylene glycol diacrylate, trimethylolpropane triacrylate, pentaerythritol tetraacrylate, diethylene glycol dimethacrylate, triethylene glycol trimethacrylate, tetraethylene glycol dimethacrylate, trimethylolpropane trimethacrylate and pentaerythritol tetramethacrylate.

3. A method as claimed in claim 1, wherein the ferromagnetic fine powder is ferromagnetic alloy powder having a metallic content of not less than 75 wt% and the metallic portion contains 80 wt% or more of a metal selected from the group consisting of Fe, Co, Ni, Fe-Co, Fe-Ni, Co-Ni and Fe-Co-Ni.

4. A method as claimed in claim 1, wherein the electron beam has an acceleration voltage of from 100 to 1,000 kv and applies an absorption dose in the range of 0.5 to 20 megarads.

5. A method as claimed in claim 4, wherein the electron beam has an acceleration voltage in the range of 150 to 300 kv and applies an absorption dose in the range of 3 to 15 megarads.

6. The method of claim 1 wherein to achieve the percent thermal shrinkage the support base is heated for 2 to 20 seconds at a temperature of 100° to 140° C. under a tension of 0 to 8 kg/100 cm·width.

7. The method of claim 6 wherein said heating is for 3 to 10 seconds at 110° to 130° C. at a tension of 0 to 4 kg/100 cm· width.

8. The method of claim 1 wherein the magnetic coating composition yields a magnetic layer having a thickness of from 1 to 50 $\mu$m.

9. The method of claim 7 wherein the magnetic coating composition yields a magnetic layer having a thickness of from 2 to 10 $\mu$m.

10. The method of claim 9 wherein the magnetic recording medium exhibits a skew of not more than 17 $\mu$sec.

* * * * *